United States Patent [19]
Konoike et al.

[11] Patent Number: 5,458,797
[45] Date of Patent: Oct. 17, 1995

[54] MAGNETIC MATERIAL FOR HIGH FREQUENCIES

[75] Inventors: Takehiro Konoike, Ashiya; Hiroshi Marusawa, Neyagawa; Hiroshi Takagi; Kunisaburo Tomono, both of Ohtsu, all of Japan

[73] Assignee: Murata Mfg. Co., Ltd., Japan

[21] Appl. No.: 278,036

[22] Filed: Jul. 20, 1994

[30] Foreign Application Priority Data

| Jul. 20, 1993 | [JP] | Japan | 5-179149 |
| Oct. 6, 1993 | [JP] | Japan | 5-250672 |
| Jun. 29, 1994 | [JP] | Japan | 6-147957 |

[51] Int. Cl.$^6$ ............................................ H01F 1/00
[52] U.S. Cl. .................. 252/62.57; 252/62.59; 252/62.56; 252/62.63
[58] Field of Search ............... 252/62.57, 62.56, 252/62.59, 62.63

[56] References Cited

FOREIGN PATENT DOCUMENTS

| 0456541 | 11/1991 | European Pat. Off. |
| 56-31289 | 7/1981 | Japan |

OTHER PUBLICATIONS

WPI Abstract of JP 81031289. Jul. 20, 1981.
Ferromagnetic Materials, vol. 2, 1987, Amsterdam NL, pp. 271–272, E. P. Wohlfarth no month.
Journal of Applied Physics., vol. 39, No. 2, 1 Feb. 1968, New York US, pp. 730–731, H. J. Van Hook et al.
Patent Abstracts of Japan, vol. 17, No. 319 (E–1383) 17 Jun. 1993 & JP-A-05036518 (Murata Mfg. Co.) 12 Feb. 1993 (Abstract).

*Primary Examiner*—Mark L. Bell
*Assistant Examiner*—C. M. Bonner
*Attorney, Agent, or Firm*—Ostrolenk, Faber, Gerb & Soffen

[57] ABSTRACT

A magnetic material for high frequencies consists essentially of a main component expressed by the general formula:

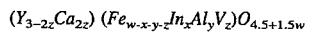

$$(Y_{3-2z}Ca_{2z})(Fe_{w-x-y-z}In_xAl_yV_z)O_{4.5+1.5w}$$

where x, y, z and w take respective values within the following ranges: $0.02 \leq x \leq 0.80$, $0.00 \leq y \leq 0.10$, $0.30 \leq z \leq 0.50$, $4.88 \leq w \leq 4.92$, and an additional component composed of at least one oxide selected from the group consisting of $CeO_2$, $TiO_2$, $ZrO_2$, $SnO_2$ and $HfO_2$. The additional component is incorporated into the main component in an amount of not less than 0.1 percent by weight but not more than 0.5 percent by weight.

5 Claims, 3 Drawing Sheets

MAGNETIC MATERIAL FOR HIGH FREQUENCIES

BACKGROUND OF THE INVENTION

1. Field of the Invention

The present invention relates to a magnetic material for high frequencies and, more particularly, to a magnetic composition of a calcium vanadium garnet system suitable for use in a range of high frequencies such as microwaves and millimeter-waves.

2. Description of the Prior Art

As a magnetic material for high frequencies, there have been used those such as manganese-magnesium ferrites, nickel-zinc ferrites, lithium ferrites and yttrium-irongarnets (YIG), calcium-vanadium-garnets, etc since they have a saturation magnetization ($4\pi Ms$) ranging from 500 to 4000 gauss. Among them, calcium-vanadium-garnets are known to be a magnetic material with a low magnetic loss which is given by a ferromagnetic resonance absorption half-line width ($\Delta H$). Thus, the calcium-vanadium-garnets make it possible to produce low-loss circuit elements such as isolators and circulators since they meet requirements for magnetic materials to be used for such purposes such that they must have not only a suitable value of $4\pi Ms$ but a small $\Delta H$.

Japanese patent publication No. 56-31289 (JP-B-56-31289) discloses a magnetic material of a system $(Ca_{3-y}Y_y)(Fe_{2-x}In_x)(Fe_{1.5+0.5y-0.5z}Si_zV_{1.5-0.5x-0.5z})O_{12}$ with low $\Delta H$, produced by replacing a part of Ca in a calcium-vanadium-garnet with Y and replacing a part of Fe with In and Si.

On the other hand, it has been reported by H. J. Van Hook and J. J. Green, "linewidth Reduction through Indium Substitution in Calcium-Vanadium Garnets", in Journal of Applied Physics, Vol. 39, No. 2, p730, 1968, that yttrium and indium substitutions in calcium-vanadium-garnets causes variations of $4\pi Ms$, decrease of the anisotropic field and reduction of $\Delta H$.

However, the above calcium-vanadium-garnets have a serious problem that a slight deviation of the composition causes considerable increase in both $\Delta H$ and dielectric dissipation factor (tan $\delta$) and thus interferes with practical uses.

Further, when the magnetic material is used for self-biased phase converting elements or latching type phase shifters, it is required to have a large ratio of remanent magnetic flux density (Br) to maximum magnetic flux density (Bm), i.e., a large squareness ratio (Br/Bm), as well as small tan $\delta$. However, the above calcium-vanadium-garnet materials cannot be applied to the phase converting elements since the greater Br/Bm the greater is tan $\delta$ and since the smaller the tan $\delta$ the smaller is Br/Bm.

SUMMARY OF THE INVENTION

The present invention has been made to overcome the above problems as well as to provide a magnetic material for high frequencies which is large in squareness ratio (Br/Bm) but small in dielectric dissipation factor (tan $\delta$), and which has a small ferromagnetic resonance absorption half-line width ($\Delta H$) and enables to obtain a desired value of $4\pi Ms$ within a certain range.

DETAILED DESCRIPTION OF THE INVENTION

The above and other objects are solved by incorporating a certain amount of an additional component composed of at least one oxide selected from the group consisting of $CeO_2$, $TiO_2$, $ZrO2$, $SnO_2$ and $HfO_2$, into a magnetic composition of a calcium-vanadium-garnet system in which a part of Ca is replaced with Y and a part of Fe is replaced with In singly or together with Al.

According to the present invention, there is provided a magnetic material for high frequencies consisting essentially of a main component of a calcium-vanadium-garnet system in which a part of Ca is replaced with Y and a part of Fe is replaced with In singly or together with Al, and a certain amount of an additional component incorporated therein, said additional component being composed of at least one oxide selected from the group consisting of $CeO_2$, $TiO_2$, $ZrO_2$, $SnO_2$ and $HfO_2$.

A preferred magnetic material for high frequencies according to the present invention consists essentially of a main component expressed by the general formula:

$$(Y_{3-2z}Ca_{2z})(Fe_{w-x-y-z}In_xAl_yV_z)O_{4.5+1.5w}$$

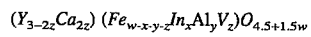

where x, y, z and w take respective values within the following ranges: $0.02 \leq x \leq 0.80$, $0.00 \leq y \leq 0.10$, $0.30 \leq z \leq 0.50$, $4.88 \leq w \leq 4.92$, and an additional component composed of at least one oxide selected from the group consisting of $CeO_2$, $TiO_2$, $ZrO_2$, $SnO_2$ and $HfO_2$, said additional component being incorporated into said main component in an amount of not less than 0.1 percent by weight but not more than 0.5 percent by weight.

If the main component contains no Al, i.e, y=0, a preferred magnetic material for high frequencies consists essentially of a main component expressed by the general formula:

$$(Y_{3-2z}Ca_{2z})(Fe_{w-x-z}In_xV_z)O_{4.5+1.5w}$$

where x, z, and w take respective values within the following ranges: $3.58 \leq w-x-z \leq 4.60$, $0.02 \leq x \leq 0.80$, $0.30 \leq z \leq 0.50$, $4.88 \leq w \leq 4.92$, and an additional component composed of at least one oxide selected from the group consisting of $CeO_2$, $TiO_2$, $ZrO_2$, $SnO_2$ and $HfO_2$, said additional component being incorporated into said main component in an amount of not less than 0.1 percent by weight but not more than 0.5 percent by weight.

If the main component contains both In and Al, a preferred magnetic material for high frequencies consists essentially of a main component expressed by the general formula:

$$(Y_{3-2z}Ca_{2z})(Fe_{w-x-y-z}In_xAl_yV_z)O_{4.5+1.5w}$$

where x, y, z and w take respective values within the following ranges: $0.02 \leq x \leq 0.80$, $0.00 < y \leq 0.10$, $0.30 \leq z \leq 0.50$, $4.88 \leq w \leq 4.92$, and an additional component composed of at least one oxide selected from the group consisting of $CeO_2$, $TiO_2$, $ZrO_2$, $SnO_2$ and $HfO_2$, said additional component being incorporated into said main component in an amount of not less than 0.1 percent by weight but not more than 0.5 percent by weight.

If the additional component is composed of at least one oxide selected from the group consisting of $TiO_2$, $ZrO_2$, $SnO_2$ and $HfO_2$, it is preferred to incorporate it into the main component in an amount of not less than 0.1 percent by weight but not more than 0.3 percent by weight.

Thus, according to the present invention, there is further provided a magnetic material for high frequencies consists essentially of a main component expressed by the general formula:

$$(Y_{3-2z}Ca_{2z})(Fe_{w-x-y-z}In_xAl_yV_z)O_{4.5+1.5w}$$

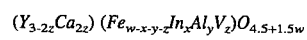

where x, y, z and w take respective values within the following ranges: $0.02 \leq x \leq 0.80$, $0.00 < y \leq 0.10$, $0.30 \leq$ $z \leq 0.50$, $4.88 \leq w \leq 4.92$, and an additional component composed of at least one oxide selected from the group consisting of $TiO_2$, $ZrO_2$, $SnO_2$ and $HfO_2$, said additional component being incorporated into said main component in an amount of not less than 0.1 percent by weight but not more than 0.3 percent by weight.

The reasons why the magnetic material of the present invention has been limited to those having a composition defined as above are as follows:

If a molar fraction of In, i.e., x is less than 0.02, or if x is more than 0.80, $\Delta H$ becomes large. Thus, x has been limited to a value ranging from 0.02 to 0.80 inclusive.

If a molar fraction of Al, i.e., y is more than 0.10, Br becomes small, and Br/Bm becomes lowered. Thus, y has been limited to a value equal to or less than 0.10.

If a molar fraction of V, i.e., z is less than 0.30, or if z exceeds 0.50, $\Delta H$ becomes large. Thus, z has been limited to a value ranging from 0.30 to 0.50 inclusive.

If w is less than 4.88, Br becomes small, and thus Br/Bm becomes lowered. If w is more than 4.92, tan $\delta$ becomes large. Thus, w has been limited to a value ranging from 4.88 to 4.92 inclusive.

The additional component has been incorporated into the main component to lower the dielectric dissipation factor (tan $\delta$). However, if the amount of the additional component is less than 0.1 wt. %, tan $\delta$ is scarcely improved. If the amount of $CeO_2$ is more than 0.5 wt. %, $\Delta H$ becomes large. Thus, the amount of additional component has been limited to a value ranging from 0.1 to 0.5 wt. % inclusive. However, if the additional component is at least one oxide selected from the group consisting of $TiO_2$, $ZrO_2$, $SnO_2$ and $HfO_2$, a preferred amount of the additional component is not less than 0.1 wt. % but not more than 0.3 wt. % since the incorporation of such an oxide exceeding 0.3 wt. % causes considerably increase in $\Delta H$.

The magnetic material of the present invention has a large squareness ratio (Br/Bm) and a small dielectric dissipation factor (tan $\delta$). Further, the magnetic material is improved in $\Delta H$ by replacing a part of Fe with In and V. In addition, it enables to control the saturation magnetization ($4\pi Ms$) to a desired value by changing the molar fractions of Al and V within the above range.

These and other objects, features and advantages of the present invention will be further apparent from the following descriptions with reference to the examples.

EXAMPLE 1

Firstly, there were prepared highly purified $Y_2O_3$, $CaCO_3$, $Fe_2O_3$, $InO_2$, $V_2O_5$ and $CeO_2$ as raw materials. These raw materials were weighed and mixed in proportions shown in Table 1, and milled by the wet process for 16 hours with a ball mill. After drying, the resultant mixture was calcined at 1050 °C. for 2 hours, crushed and then ground along with an organic binder by the wet process for 16 hours with a ball mill. The resultant granulated powder was dried, passed through a 50 mesh sieve to obtain minus sieves. The powder was compacted into square rods of 5 mm by 5 mm by 20 mm, disks with a diameter of 10 mm and a thick of 1 mm, and rings with an outer diameter of 36 mm, an inner diameter of 24 mm and a thickness of 6 mm under a pressure of 2000 Kg/cm². The green compacts were fired at a temperature of 1300° to 1360 °C. for 8 hours to prepare sintered bodies of ceramic square rods, disks and rings.

The square ceramic rods were machined to prepare spherical specimens with a diameter of 2 mm and columnar specimens with a diameter of 1.3 mm and a length of 16 mm. For each spherical specimen, the saturation magnetization ($4\pi Ms$) was measured with a vibrating sample magnetometer. For each columnar specimen, dielectric dissipation factor (tan $\delta$) was measured at 10 GHz with a TM101 mode cavity resonator by the perturbation method.

The ceramic disks were machined to prepare disk specimens with a diameter of 7 mm and a thickness of 0.3 mm. The specimen was placed in a resonator with strip lines of $\lambda/2$ to determine ferromagnetic resonance absorption halfline width ($\Delta H$) at 1GHz.

Using the ceramic rings, there were prepared ring transformers with bifilar toroidal coils of 30 turns by winding two copper wires round the ring. For each specimen, remanent magnetic flux density (Br) and maximum magnetic flux density (Bm) were measured at 100 Hz.

Figure 1:
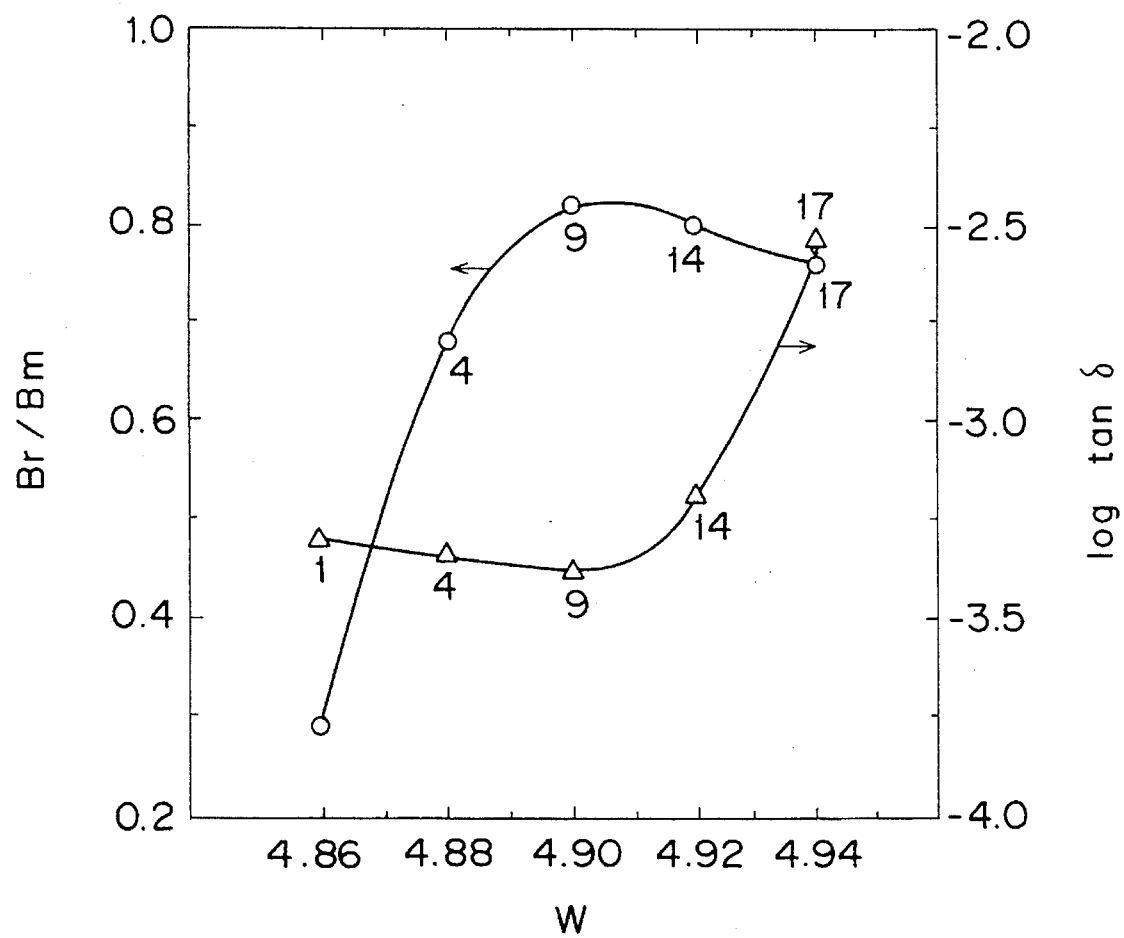
FIG. 1 is a graph illustrating influences of w on electrical properties (Br/Bm) and log (tan $\delta$) of a system $(Y_{3-2z}Ca_{2z})(Fe_{w-x-z}In_xV_z)O_{4.5+1.5w}+CeO_2$.

The results are shown in Table 1 in which specimens with an asterisk (*) are those out of the scope of the present invention, while other specimens are those falling within the scope of the present invention. Also, the values of Br/Bm and tan $\delta$ for specimens Nos. 1, 4, 9, 14 and 17 are plotted in FIG. 1 as a function of w in the system. In FIG. 1, the data for the dielectric loss are plotted by taking the common logarithm of dielectric dissipation factor (tan $\delta$) and numerals corresponds to the respective specimen numbers.

TABLE 1

| No. | $(Y_{3-2z}Ca_{2z})(Fe_{w-x-z}In_xV_z)O_{4.5+1.5w}$ | | | | $CeO_2$ (wt %) | $4\pi Ms$ (gauss) | $\Delta H$ (Oe) | tan $\delta$ ($\times 10^{-4}$) | Br (gauss) | Br/Bm |
|---|---|---|---|---|---|---|---|---|---|---|
| | w − x − z | x | z | w | | | | | | |
| 1* | 4.06 | 0.40 | 0.40 | 4.86 | 0.2 | 1050 | 12 | 5.0 | 250 | 0.29 |
| 2* | 4.08 | 0.40 | 0.40 | 4.88 | 0.05 | 1080 | 10 | 28.1 | 610 | 0.64 |
| 3 | 4.08 | 0.40 | 0.40 | 4.88 | 0.1 | 1090 | 10 | 9.1 | 620 | 0.68 |
| 4 | 4.08 | 0.40 | 0.40 | 4.88 | 0.2 | 1090 | 9 | 4.6 | 640 | 0.68 |
| 5 | 4.08 | 0.40 | 0.40 | 4.88 | 0.5 | 1080 | 13 | 4.9 | 630 | 0.67 |
| 6* | 4.08 | 0.40 | 0.40 | 4.88 | 1.0 | 1080 | 36 | 6.0 | 620 | 0.66 |

TABLE 1-continued

| No. | $(Y_{3-2z}Ca_{2z})(Fe_{w-x-z}In_xV_z)O_{4.5+1.5w}$ | | | | $CeO_2$ (wt %) | $4\pi Ms$ (gauss) | $\Delta H$ (Oe) | $\tan\delta$ ($\times 10^{-4}$) | $Br$ (gauss) | $Br/Bm$ |
|---|---|---|---|---|---|---|---|---|---|---|
| | w − x − z | x | z | w | | | | | | |
| 7* | 4.10 | 0.40 | 0.40 | 4.90 | 0.05 | 1070 | 8 | 29.2 | 620 | 0.81 |
| 8 | 4.10 | 0.40 | 0.40 | 4.90 | 0.1 | 1070 | 8 | 9.2 | 630 | 0.81 |
| 9 | 4.10 | 0.40 | 0.40 | 4.90 | 0.2 | 1080 | 7 | 4.2 | 650 | 0.82 |
| 10 | 4.10 | 0.40 | 0.40 | 4.90 | 0.5 | 1080 | 10 | 5.5 | 640 | 0.79 |
| 11* | 4.10 | 0.40 | 0.40 | 4.90 | 1.0 | 1080 | 37 | 6.1 | 620 | 0.79 |
| 12* | 4.12 | 0.40 | 0.40 | 4.92 | 0.05 | 1060 | 9 | 26.9 | 600 | 0.77 |
| 13 | 4.12 | 0.40 | 0.40 | 4.92 | 0.1 | 1060 | 8 | 9.0 | 620 | 0.78 |
| 14 | 4.12 | 0.40 | 0.40 | 4.92 | 0.2 | 1080 | 8 | 6.5 | 640 | 0.80 |
| 15 | 4.12 | 0.40 | 0.40 | 4.92 | 0.5 | 1070 | 11 | 7.0 | 630 | 0.80 |
| 16* | 4.12 | 0.40 | 0.40 | 4.92 | 1.0 | 1070 | 35 | 7.7 | 630 | 0.80 |
| 17* | 4.14 | 0.40 | 0.40 | 4.94 | 0.2 | 1070 | 9 | 28.8 | 610 | 0.76 |
| 18* | 4.495 | 0.005 | 0.40 | 4.90 | 0.2 | 910 | 52 | 5.5 | 550 | 0.79 |
| 19 | 4.48 | 0.02 | 0.40 | 4.90 | 0.2 | 920 | 13 | 4.9 | 620 | 0.81 |
| 20 | 4.40 | 0.10 | 0.40 | 4.90 | 0.2 | 990 | 9 | 4.4 | 630 | 0.81 |
| 21 | 4.10 | 0.40 | 0.40 | 4.90 | 0.2 | 1080 | 7 | 4.2 | 650 | 0.82 |
| 22 | 3.70 | 0.80 | 0.40 | 4.90 | 0.2 | 1010 | 11 | 4.3 | 650 | 0.82 |
| 23* | 3.50 | 1.00 | 0.40 | 4.90 | 0.2 | 760 | 49 | 4.8 | 640 | 0.81 |
| 24* | 4.30 | 0.40 | 0.20 | 4.90 | 0.2 | 1440 | 45 | 3.8 | 930 | 0.77 |
| 25 | 4.20 | 0.40 | 0.30 | 4.90 | 0.2 | 1300 | 12 | 4.1 | 770 | 0.80 |
| 26 | 4.10 | 0.40 | 0.40 | 4.90 | 0.2 | 1080 | 7 | 4.2 | 650 | 0.82 |
| 27 | 4.00 | 0.40 | 0.50 | 4.90 | 0.2 | 880 | 11 | 4.2 | 560 | 0.81 |
| 28* | 3.90 | 0.40 | 0.60 | 4.90 | 0.2 | 810 | 41 | 4.6 | 510 | 0.81 |

As will be understood from the data shown in Table 1, the magnetic material of the present invention is large in squareness ratio (Br/Bm) but small in dielectric dissipation factor (tan δ). Further, the magnetic material of the present invention has a small ferromagnetic resonance absorption half-line width (ΔH). In addition, the saturation magnetization (4πMs) ranges from 880 to 1300 gauss with molar fractions of substituents. Accordingly, the magnetic material of the present invention makes it possible to produce highly stable circuit elements for microwave and millimeter wave frequencies, such as latching type phase convertors, isolators, circulators and the like.

In contrast therewith, if w is less than 4.88 like as specimen No. 1, Br becomes small, and Br/Bm becomes lowered. If w exceeds 4.92 like as specimen No. 17, tan δ becomes large (e.g. 28.8×10$^{-4}$ for specimen No. 17). From the results shown in FIG. 1, it will be seen that a magnetic material with a large Br/Bm and a small tan δ can be produced only when w takes a value within the range of 4.88 to 4.92.

If a molar fraction of In, i.e., x, is less than 0.02 like as specimen No. 18, or if x exceeds 0.80 like as specimen No. 23, ΔH becomes considerably increased.

If a molar fraction of V, i.e., z is less than 0.30 like as specimen No. 24, or if z exceeds 0.50 like as specimen No. 28, ΔH becomes large.

In order to meet the conditions for w, x and z (i.e., 4.88≦w≦4.92, 0.02≦x≦0.80, and 0.30≦z≦0.50), a molar fraction of Fe, i.e., (w-x-z) should take a value ranging from 3.58 to 4.60 inclusive.

If the amount of $CeO_2$ is less than 0.1 wt. % like as specimens Nos. 2, 7 and 12, tan δ is scarcely improved. If the amount of $CeO_2$ exceeds 0.5 wt. % like as specimens Nos. 6, 11 and 16, ΔH becomes large.

EXAMPLE 2

Using highly purified $Y_2O_3$, $CaCO_3$, $Fe_2O_3$, $InO_2$, $Al_2O_3$, $V_2O_5$ and $CeO_2$ as raw materials, there were prepared specimens in the following manner. The raw materials were weighed and mixed in proportions shown in Table 2, and milled by the wet process for 16 hours with a ball mill. After drying, the resultant mixture was calcined at 1050 ° C. for 2 hours, crushed and then ground along with an organic binder by the wet process for 16 hours with a ball mill.

Figure 2:
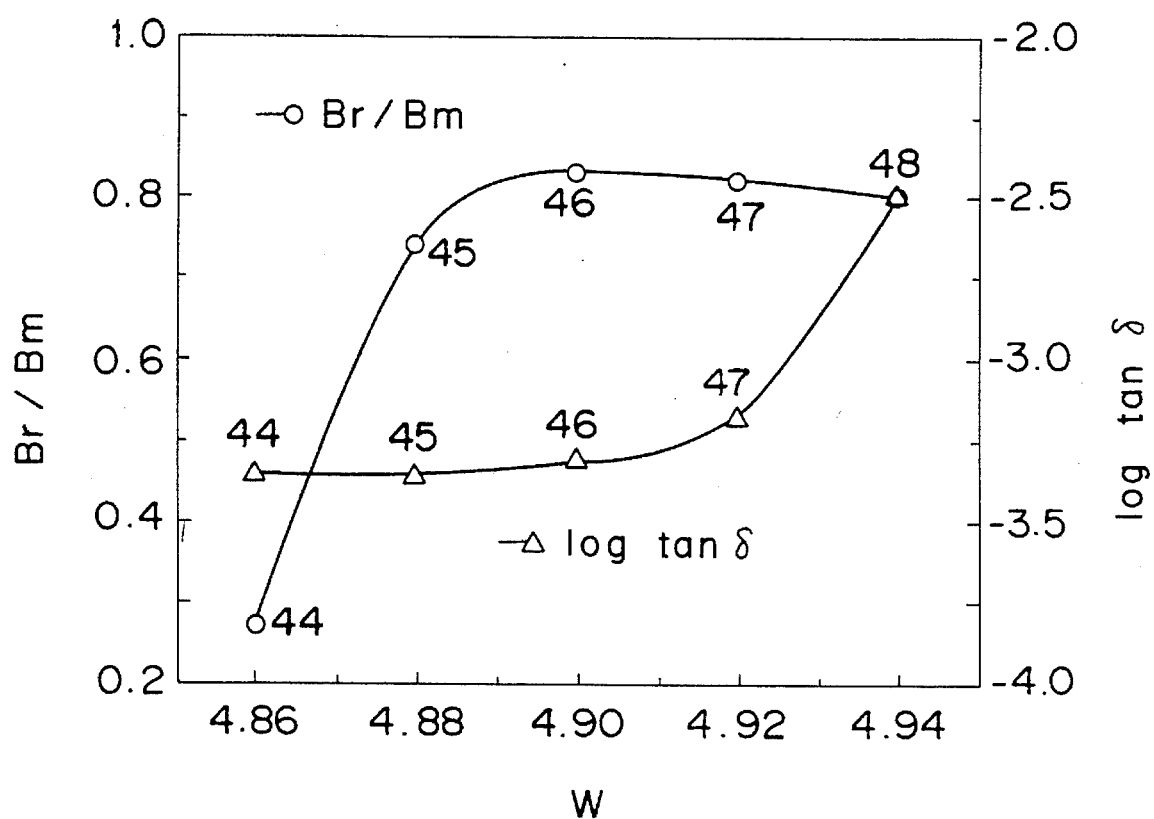
FIG. 2 is a graph illustrating influences of w on electrical properties (Br/Bm) and log (tan $\delta$) of a system $(Y_{3-2z}Ca_{2z})(Fe_{w-x-y-z}In_xAl_yV_z)O_{4.5+1.5w}+CeO_2$.

Using the resultant granulated powders, there were prepared test specimens in the same manner as Example 1. Measurements were made on 4πMs, tan δ, ΔH, Br and Bm under the same conditions as those described in Example 1. The results are shown in Table 2 in which specimens with an asterisk (*) are those out of the scope of the present invention, while other specimens are those falling within the scope of the present invention. Also, the values of Br/Bm and tan δ for specimens Nos. 44–48 are plotted in FIG. 2 as a function of w in the system $(Y_{3-2z}Ca_{2z})(Fe_{w-x-y-z}In_xAl_yV_z)O_{4.5+1.5w}$. In FIG. 2 the data for the dielectric loss are plotted by taking the common logarithm of tan δ and numerals corresponds to the respective specimen numbers.

TABLE 2

| No. | $(Y_{3-2z}Ca_{2z})(Fe_{w-x-y-z}In_xAl_yV_z)O_{4.5+1.5w}$ | | | | $CeO_2$ (wt %) | $4\pi Ms$ (gauss) | $\Delta H$ (Oe) | $\tan\delta$ ($\times 10^{-4}$) | $Br$ (gauss) | $Br/Bm$ |
|---|---|---|---|---|---|---|---|---|---|---|
| | x | y | z | w | | | | | | |
| 29* | 0.05 | 0.05 | 0.40 | 4.90 | 0.2 | 660 | 56 | 5.8 | 390 | 0.80 |
| 30 | 0.02 | 0.05 | 0.40 | 4.90 | 0.2 | 680 | 12 | 5.0 | 430 | 0.81 |
| 31 | 0.10 | 0.05 | 0.40 | 4.90 | 0.2 | 700 | 8 | 4.9 | 440 | 0.81 |
| 32 | 0.40 | 0.05 | 0.40 | 4.90 | 0.2 | 790 | 7 | 4.8 | 480 | 0.83 |

TABLE 2-continued

| No. | (Y$_{3-2z}$Ca$_{2z}$)(Fe$_{w-x-y-z}$In$_x$Al$_y$V$_z$)O$_{4.5+1.5w}$ | | | | CeO$_2$ | $4\pi$Ms | $\Delta$H | tan $\delta$ | Br | Br/Bm |
| | x | y | z | w | (wt %) | (gauss) | (Oe) | ($\times 10^{-4}$) | (gauss) | |
|---|---|---|---|---|---|---|---|---|---|---|
| 33 | 0.80 | 0.05 | 0.40 | 4.90 | 0.2 | 740 | 11 | 4.6 | 450 | 0.82 |
| 34* | 1.00 | 0.05 | 0.40 | 4.90 | 0.2 | 510 | 48 | 5.2 | 350 | 0.81 |
| 35 | 0.40 | 0.00 | 0.40 | 4.90 | 0.2 | 1080 | 7 | 4.2 | 650 | 0.82 |
| 36 | 0.40 | 0.05 | 0.40 | 4.90 | 0.2 | 790 | 7 | 4.8 | 480 | 0.83 |
| 37 | 0.40 | 0.10 | 0.40 | 4.90 | 0.2 | 470 | 12 | 8.8 | 300 | 0.79 |
| 38* | 0.40 | 0.15 | 0.40 | 4.90 | 0.2 | 210 | 15 | 10.2 | 150 | 0.31 |
| 39* | 0.40 | 0.05 | 0.20 | 4.90 | 0.2 | 1160 | 53 | 4.4 | 720 | 0.78 |
| 40 | 0.40 | 0.05 | 0.30 | 4.90 | 0.2 | 1020 | 14 | 5.1 | 630 | 0.80 |
| 41 | 0.40 | 0.05 | 0.40 | 4.90 | 0.2 | 790 | 7 | 4.8 | 480 | 0.83 |
| 42 | 0.40 | 0.05 | 0.50 | 4.90 | 0.2 | 610 | 12 | 4.1 | 380 | 0.81 |
| 43* | 0.40 | 0.05 | 0.60 | 4.90 | 0.2 | 550 | 44 | 5.9 | 330 | 0.79 |
| 44* | 0.40 | 0.05 | 0.40 | 4.86 | 0.2 | 760 | 13 | 4.4 | 200 | 0.27 |
| 45 | 0.40 | 0.05 | 0.40 | 4.88 | 0.2 | 810 | 9 | 4.4 | 460 | 0.74 |
| 46 | 0.40 | 0.05 | 0.40 | 4.90 | 0.2 | 790 | 7 | 4.8 | 480 | 0.83 |
| 47 | 0.40 | 0.05 | 0.40 | 4.92 | 0.2 | 780 | 8 | 6.6 | 480 | 0.82 |
| 48* | 0.40 | 0.05 | 0.40 | 4.94 | 0.2 | 770 | 10 | 31.2 | 460 | 0.80 |
| 49* | 0.40 | 0.05 | 0.40 | 4.90 | 0.05 | 800 | 11 | 27.5 | 490 | 0.81 |
| 50 | 0.40 | 0.05 | 0.40 | 4.90 | 0.1 | 790 | 8 | 6.1 | 480 | 0.82 |
| 51 | 0.40 | 0.05 | 0.40 | 4.90 | 0.2 | 790 | 7 | 4.8 | 480 | 0.83 |
| 52 | 0.40 | 0.05 | 0.40 | 4.90 | 0.5 | 790 | 14 | 5.2 | 460 | 0.80 |
| 53* | 0.40 | 0.05 | 0.40 | 4.90 | 1.0 | 780 | 14 | 6.6 | 460 | 0.79 |

As will be understood from the results shown in FIG. 2, the magnetic material has a large Br/Bm and a small tan $\delta$ only when w takes a value within the range of 4.88 to 4.92 inclusive. Further, from the data for specimens Nos. 35–38 shown in Table 2, it will be seen that $4\pi$Ms varies from 470 to 1080 gauss with the molar fractions of Al$_2$O$_3$.

EXAMPLE 3

Using highly purified Y$_2$O$_3$, CaCO$_3$, Fe$_2$O$_3$, InO$_2$, Al$_2$O$_3$, V$_2$O$_5$ and CeO$_2$, TiO$_2$, ZrO$_2$, SnO$_2$, HfO$_2$ as raw materials, there were prepared specimens in the following manner. The raw materials were weighed and mixed in proportions shown in Table 3, and milled by the wet process for 16 hours with a ball mill. After drying, the resultant mixture was calcined at 1050 °C. for 2 hours, crushed and then ground along with an organic binder by the wet process for 16 hours with a ball mill.

Using the resultant granulated powders, there were prepared test specimens in the same manner as Example 1. Measurements were made on $4\pi$Ms, tan $\delta$, $\Delta$H, Br and Bm under the same conditions as those described in Example 1. The results are shown in Table 3 in which specimens with an asterisk (*) are those out of the scope of the present invention. Also, the values of Br/Bm and the common logarithm of tan a for specimens Nos. 68–72 are plotted in FIG. 3 as a function of w in the system (Y$_{3-2z}$Ca$_{2z}$)(Fe$_{w-x-y-z}$In$_x$Al$_y$V$_z$)O$_{4.5+1.5w}$.

TABLE 3

| No. | (Y$_{3-2z}$Ca$_{2z}$)(Fe$_{w-x-y-z}$In$_x$Al$_y$V$_z$)O$_{4.5+1.5w}$ | | | | Additive | $4\pi$Ms | $\Delta$H | tan $\delta$ | Br | Br/Bm |
| | x | y | z | w | (wt %) | (gauss) | (Oe) | ($\times 10^{-4}$) | (gauss) | |
|---|---|---|---|---|---|---|---|---|---|---|
| 54* | 0.01 | 0.10 | 0.40 | 4.90 | TiO$_2$: 0.2 | 610 | 62 | 6.9 | 400 | 0.79 |
| 55 | 0.05 | 0.10 | 0.40 | 4.90 | TiO$_2$: 0.2 | 620 | 14 | 6.1 | 410 | 0.79 |
| 56 | 0.30 | 0.10 | 0.40 | 4.90 | TiO$_2$: 0.2 | 640 | 8 | 5.7 | 420 | 0.81 |
| 57 | 0.60 | 0.10 | 0.40 | 4.90 | TiO$_2$: 0.2 | 630 | 13 | 5.6 | 410 | 0.81 |
| 58* | 1.00 | 0.10 | 0.40 | 4.90 | TiO$_2$: 0.2 | 590 | 55 | 6.3 | 370 | 0.80 |
| 59 | 0.30 | 0.00 | 0.40 | 4.90 | TiO$_2$: 0.2 | 1060 | 8 | 4.4 | 680 | 0.83 |
| 60 | 0.30 | 0.10 | 0.40 | 4.90 | TiO$_2$: 0.2 | 640 | 8 | 5.7 | 420 | 0.81 |
| 61 | 0.30 | 0.25 | 0.40 | 4.90 | TiO$_2$: 0.2 | 330 | 11 | 6.6 | 230 | 0.68 |
| 62* | 0.30 | 0.40 | 0.40 | 4.90 | TiO$_2$: 0.2 | 120 | 18 | 9.1 | 60 | 0.19 |
| 63* | 0.30 | 0.10 | 0.20 | 4.90 | TiO$_2$: 0.2 | 1090 | 58 | 5.2 | 690 | 0.78 |
| 64 | 0.30 | 0.10 | 0.30 | 4.90 | TiO$_2$: 0.2 | 850 | 16 | 5.1 | 550 | 0.80 |
| 65 | 0.30 | 0.10 | 0.40 | 4.90 | TiO$_2$: 0.2 | 640 | 8 | 5.7 | 420 | 0.81 |
| 66 | 0.30 | 0.10 | 0.50 | 4.90 | TiO$_2$: 0.2 | 470 | 11 | 6.0 | 320 | 0.81 |
| 67* | 0.30 | 0.10 | 0.60 | 4.90 | TiO$_2$: 0.2 | 310 | 50 | 7.1 | 220 | 0.80 |
| 68* | 0.30 | 0.10 | 0.40 | 4.86 | TiO$_2$: 0.2 | 570 | 16 | 5.3 | 180 | 0.29 |
| 69 | 0.30 | 0.10 | 0.40 | 4.88 | TiO$_2$: 0.2 | 650 | 12 | 5.3 | 410 | 0.74 |
| 70 | 0.30 | 0.10 | 0.40 | 4.90 | TiO$_2$: 0.2 | 640 | 8 | 5.7 | 420 | 0.81 |
| 71 | 0.30 | 0.10 | 0.40 | 4.92 | TiO$_2$: 0.2 | 640 | 10 | 7.5 | 420 | 0.80 |
| 72* | 0.30 | 0.10 | 0.40 | 4.94 | TiO$_2$: 0.2 | 630 | 13 | 42.2 | 400 | 0.75 |
| 73* | 0.30 | 0.10 | 0.40 | 4.90 | TiO$_2$: 0.02 | 600 | 12 | 26.4 | 380 | 0.79 |
| 74* | 0.30 | 0.10 | 0.40 | 4.90 | ZrO$_2$: 0.05 | 610 | 10 | 27.1 | 380 | 0.79 |

TABLE 3-continued

| No. | $(Y_{3-2z}Ca_{2z})$ $(Fe_{w-x-y-z}In_xAl_yV_z)O_{4.5+1.5w}$ | | | | Additive | $4\pi Ms$ | $\Delta H$ | $\tan \delta$ | Br | |
|---|---|---|---|---|---|---|---|---|---|---|
| | x | y | z | w | (wt %) | (gauss) | (Oe) | ($\times 10^{-4}$) | (gauss) | Br/Bm |
| 75 | 0.30 | 0.10 | 0.40 | 4.90 | $ZrO_2$: 0.1 | 610 | 12 | 8.8 | 400 | 0.79 |
| 76 | 0.30 | 0.10 | 0.40 | 4.90 | $ZrO_2$: 0.2 | 630 | 7 | 4.1 | 400 | 0.80 |
| 77 | 0.30 | 0.10 | 0.40 | 4.90 | $ZrO_2$: 0.1 $SnO_2$: 0.1 | 640 | 9 | 5.5 | 410 | 0.81 |
| 78 | 0.30 | 0.10 | 0.40 | 4.90 | $ZrO_2$: 0.2 | 640 | 12 | 6.2 | 400 | 0.79 |
| 79 | 0.30 | 0.10 | 0.40 | 4.90 | $SnO_2$: 0.2 | 650 | 7 | 3.8 | 420 | 0.81 |
| 80 | 0.30 | 0.10 | 0.40 | 4.90 | $HfO_2$: 0.2 | 650 | 11 | 4.4 | 420 | 0.81 |
| 81 | 0.30 | 0.10 | 0.40 | 4.90 | $TiO_2$: 0.1 $ZrO_2$: 0.1 $SnO_2$: 0.1 | 650 | 14 | 6.6 | 410 | 0.80 |
| 82 | 0.30 | 0.10 | 0.40 | 4.90 | $ZrO_2$: 0.1 $SnO_2$: 0.1 $HfO_2$: 0.1 | 640 | 12 | 5.9 | 410 | 0.80 |
| 83 | 0.30 | 0.00 | 0.40 | 4.90 | $HfO_2$: 0.3 | 650 | 12 | 5.5 | 420 | 0.81 |
| 84* | 0.30 | 0.10 | 0.40 | 4.90 | $TiO_2$: 0.2 $ZrO_2$: 0.3 | 640 | 37 | 7.6 | 420 | 0.78 |
| 85* | 0.30 | 0.10 | 0.40 | 4.90 | $ZrO_2$: 0.5 | 620 | 41 | 6.8 | 410 | 0.79 |
| 86* | 0.30 | 0.10 | 0.40 | 4.90 | $HfO_2$: 1.0 | 630 | 82 | 10.8 | 420 | 0.79 |

Figure 3:
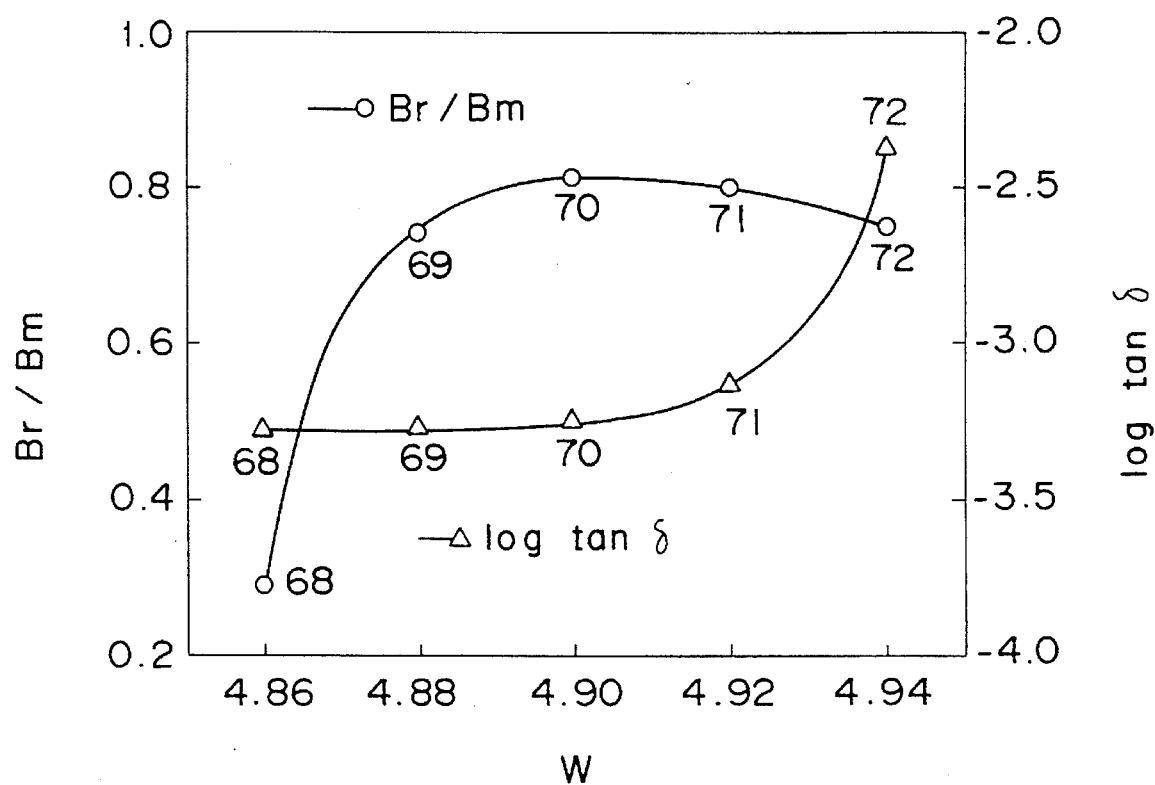
FIG. 3 is a graph illustrating influences of w on electrical properties (Br/Bm) and log (tan $\delta$) of a system $(Y_{3-2z}Ca_{2z})(Fe_{w-x-y-z}In_xAl_yV_z)O_{4.5+1.5w}+(TiO_2, ZrO_2, SnO_2, HfO_2)$.

As will be understood from the results shown in FIG. 3, the magnetic material has a large Br/Bm and a small $\tan \delta$ only when w takes a value within the range of 4.88 to 4.92 inclusive. Further, from the data shown in Table 2, it will be seen that $4\pi Ms$ ranges from 330 to 1060 gauss with the molar fractions of Al. In addition, the incorporation of additional components contributes to improve the dielectric dissipation factor.

What is claimed is:

1. A magnetic material for high frequencies consisting essentially of a main component of a calcium-vanadium-garnet system wherein a part of Ca is replaced with Y and a part of Fe is replaced with In singly or together with Al, and an amount of not less than 0.1 percent by weight but not more than 0.5 percent by weight of an additional component incorporated therein, said additional component being composed of at least one oxide selected from the group consisting of $CeO_2$, $TiO_2$, $ZrO_2$, $SnO_2$ and $HfO_2$.

2. A magnetic material for high frequencies consisting essentially of a main component expressed by the general formula:

$$(Y_{3-2z}Ca_{2z}) (Fe_{w-x-y-z}In_xAl_yV_z)O_{4.5+1.5w}$$

where x, y, z and w take respective values within the following ranges: $0.02 \leq x \leq 0.80$, $0.00 \leq y \leq 0.10$, $0.30 \leq z \leq 0.50$, $4.88 \leq w \leq 4.92$, and an additional component composed of at least one oxide selected from the group consisting of $CeO_2$, $TiO_2$, $ZrO_2$, $SnO_2$ and $HfO_2$, said additional component being incorporated into said main component in an amount of not less than 0.1 percent by weight but not more than 0.5 percent by weight.

3. The magnetic material for high frequencies according to claim 2 wherein said main component contains no Al and has a composition expressed by the general formula:

$$(Y_{3-2z}Ca_{2z}) (Fe_{w-x-z}In_xV_z)O_{4.5+1.5w}$$

where x, z, and w take respective values within the following ranges: $3.58 \leq w-x-z \leq 4.60$, $0.02 \leq x \leq 0.80$, $0.30 \leq z \leq 0.50$, $4.88 \leq w \leq 4.92$.

4. The magnetic material for high frequencies according to claim 2 wherein said main component contains In and Al and has a composition expressed by the general formula:

$$(Y_{3-2z}Ca_{2z}) (Fe_{w-x-y-z}In_xAl_yV_z)O_{4.5+1.5w}$$

where x, y, z and w take respective values within the following ranges: $0.02 \leq x \leq 0.80$, $0.00 < y \leq 0.10$, $0.30 \leq z \leq 0.50$, $4.88 \leq w \leq 4.92$.

5. The magnetic material for high frequencies according to claim 2 wherein said additional component is composed of at least one oxide selected from the group consisting of $TiO_2$, $ZrO_2$, $SnO_2$ and $HfO_2$, the content of said additional component being not less than 0.1 percent by weight but not more than 0.3 percent by weight.

* * * * *